United States Patent
Pierce et al.

[15] 3,698,056
[45] Oct. 17, 1972

[54] GAGE HEAD

[72] Inventors: Guy Donald Pierce, Birmingham, Mich.; Rudi K. Runft, Windsor, Ontario, Canada

[73] Assignee: The Cross Company, Fraser, Mich.

[22] Filed: May 17, 1971

[21] Appl. No.: 143,966

Related U.S. Application Data

[63] Continuation-in-part of Ser. No. 669,103, Sept. 20, 1967, abandoned, Continuation of Ser. No. 19,551, March 19, 1970, abandoned.

[52] U.S. Cl............................................29/201, 29/407
[51] Int. Cl..........................B23p 19/04, B23q 17/00
[58] Field of Search.....29/201, 201 D, 200 R, 200 B, 29/208 R, 208 C

[56] References Cited

UNITED STATES PATENTS 3,029,498    4/1962    Sharpe..........................29/201

*Primary Examiner*—Thomas H. Eager
*Attorney*—Harness, Dickey & Pierce

[57] ABSTRACT

A gage head mechanism for selecting bearing shims during assembly of a differential drive for insertion behind the differential bearings at opposite sides of the differential case so as to assure a proper and acceptable amount of backlash between the ring gear and the drive pinion.

The gage head mechanism is adapted to provide a proper and acceptable backlash between the drive pinion and the ring gear under conditions in which the differential case is supported in the differential carrier with the side bearings loosely resting on and shiftable relative to the side bearing seats. The mechanism includes spaced gage heads including reciprocable clamps which are movable in opposite directions against the side bearings to shift the side bearings and the differential case within the differential carrier and simultaneously preload the bearings to a predetermined force, and thus load the ring gear and drive pinion. Upon seating of the spaced gage heads, a rotary drive is positioned in engagement with the differential drive and operates to rotate the differential case while the bearings are preloaded by the clamps.

The gage head includes a transducer assembly which measures the axial spacing between the bearing seat and the bearings under the preload conditions, and thus the runout of the ring gear during rotation of the differential case by the rotary drive means. An electrical system may be provided for deriving a signal from the transducer for measuring the space between the bearings and their respective seats. This measurement is used to select and cause the placement of suitably sized shims when the case is positioned in the mean runout position, and the illustrated system includes a brake assembly for stopping the rotation of the gage head automatically in the mean runout position.

The purpose of the foregoing abstract is to enable the Patent Office and the public generally, and especially the scientists, engineers, or practitioners in the art who are not familiar with patent or legal terms or phraseology, to determine quickly from a cursory inspection, the nature and essence of the technical disclosure of the application. The abstract is neither intended to define the invention of the application, which is measured by the claims, nor is it intended to be limiting as to the scope of the invention in any way.

28 Claims, 15 Drawing Figures

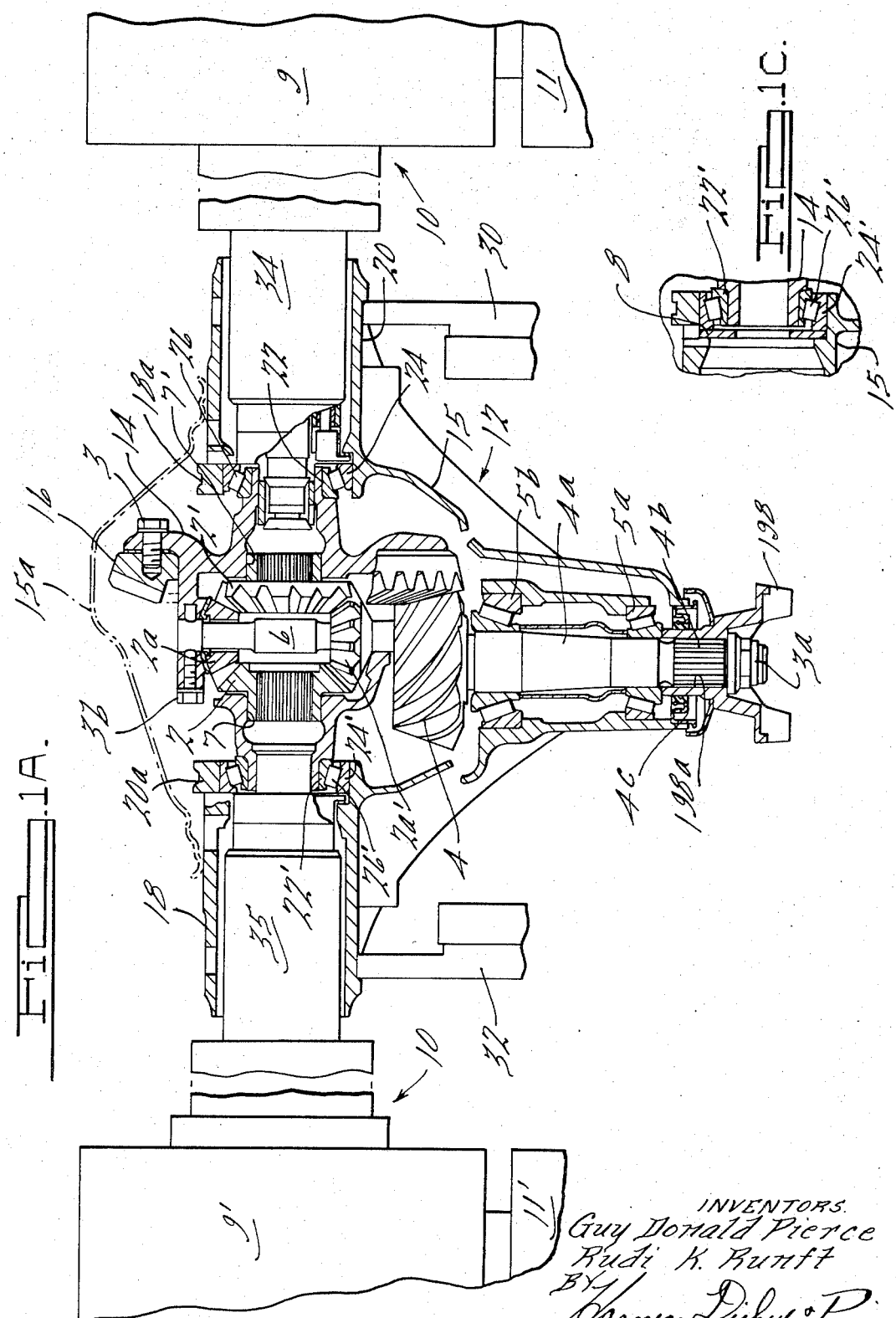

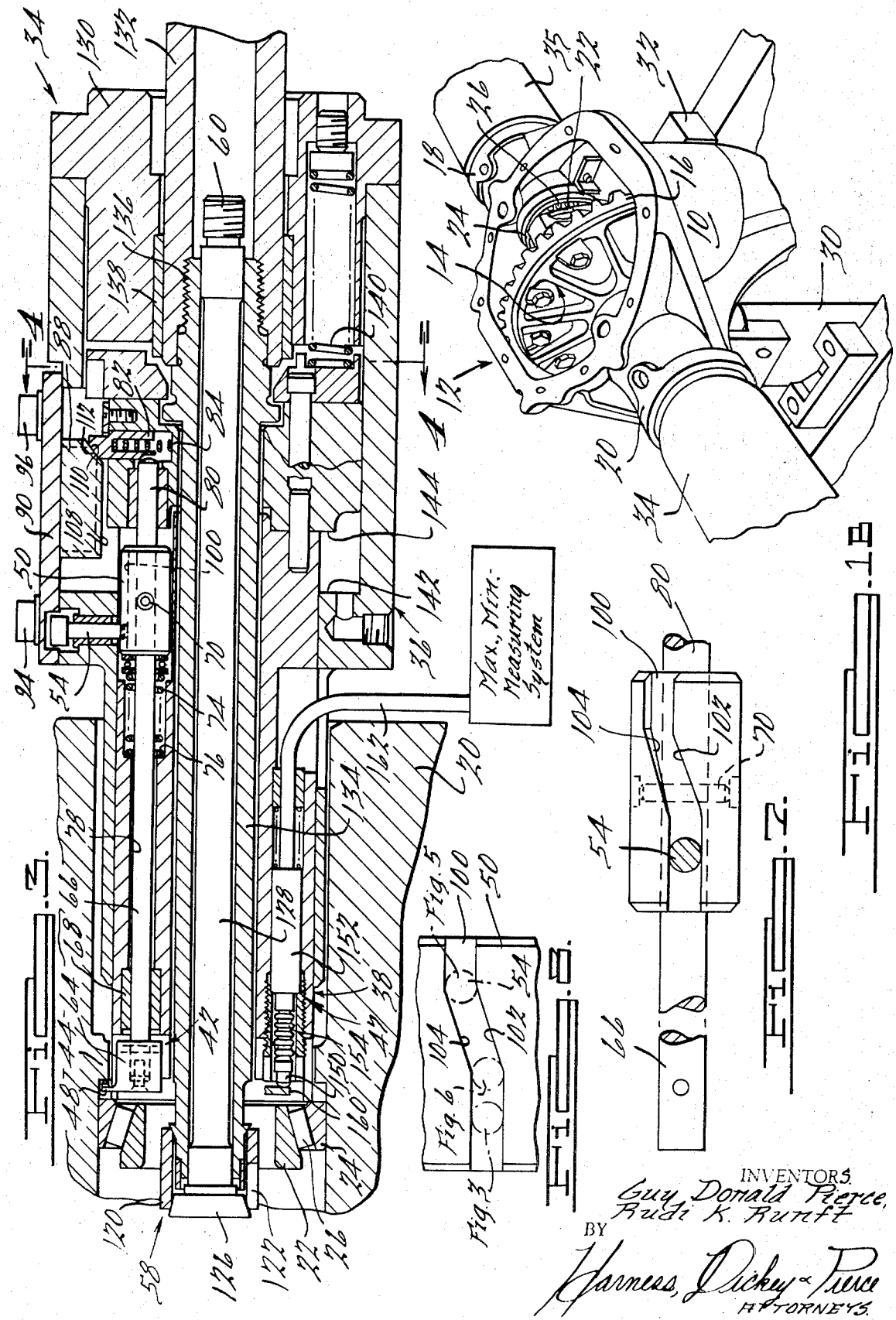

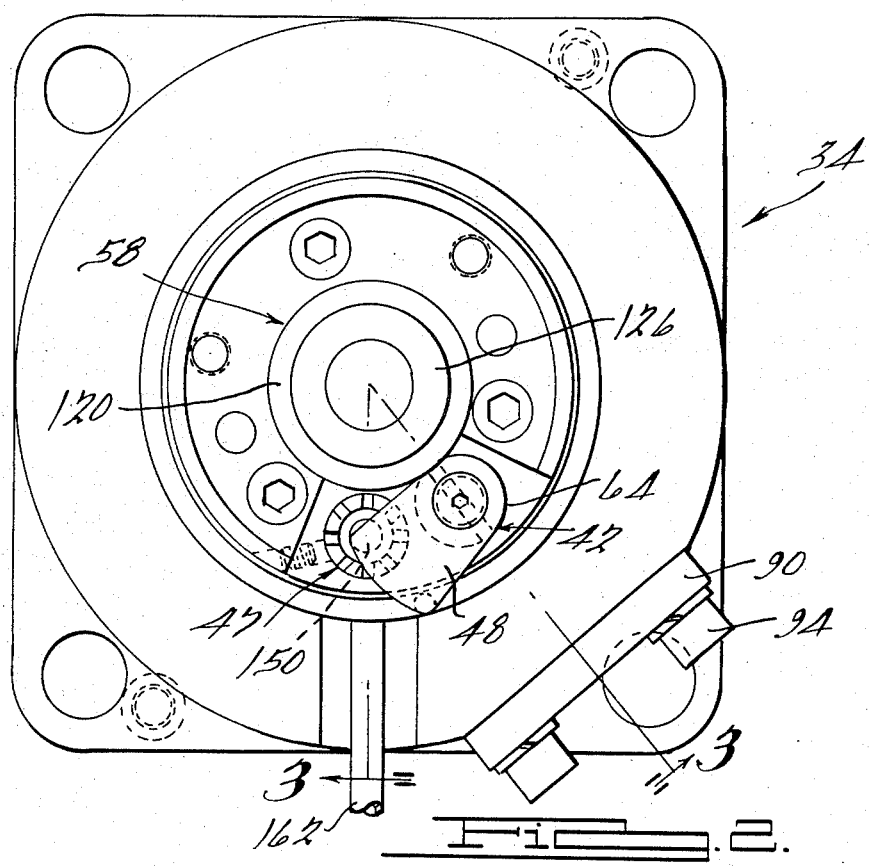
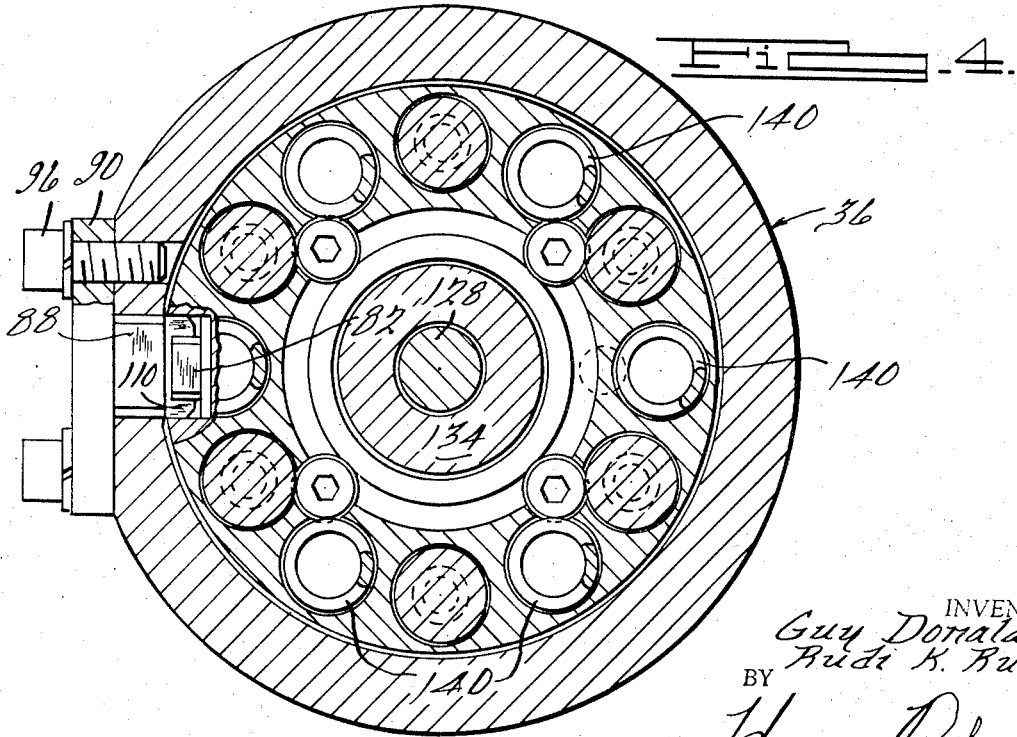

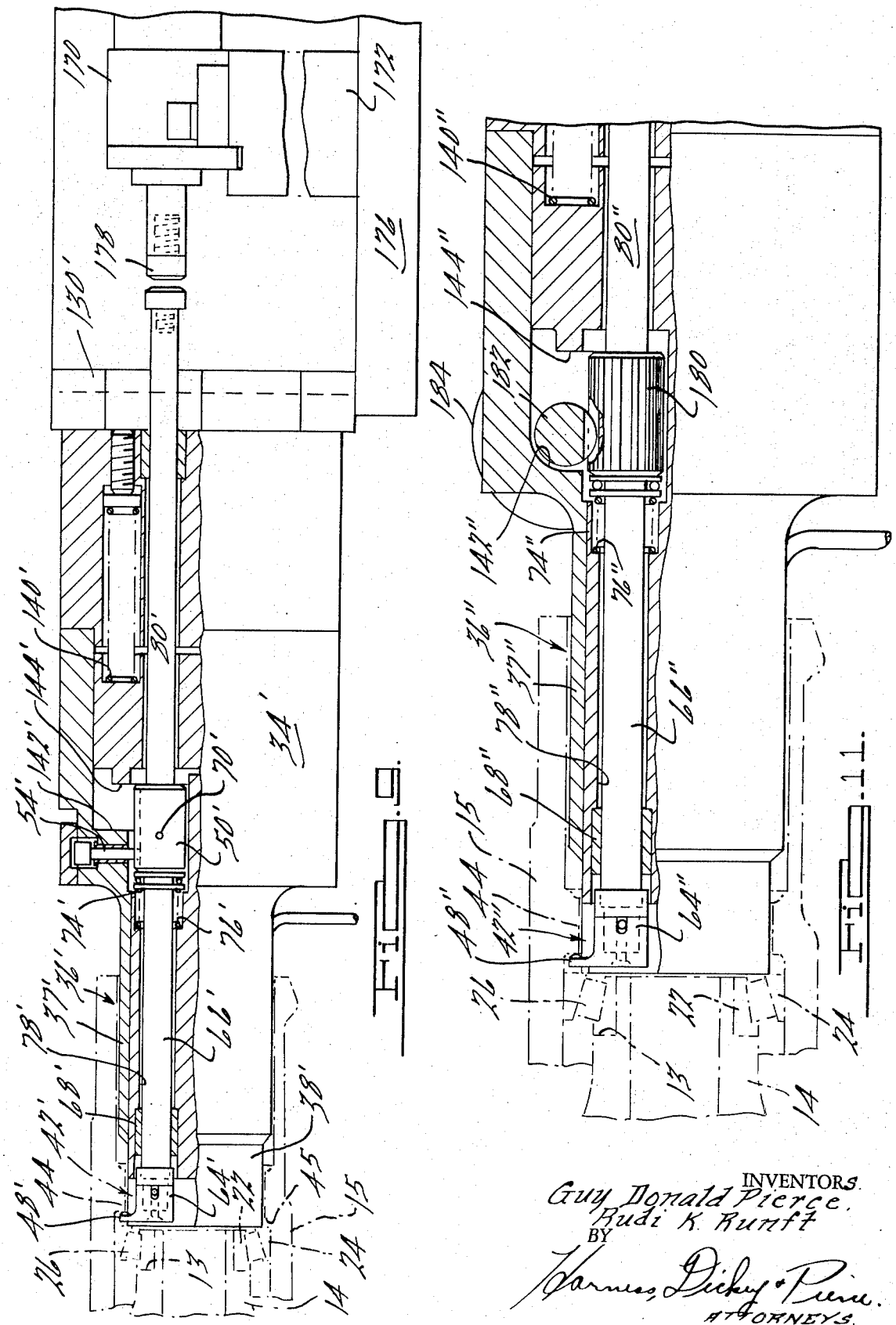

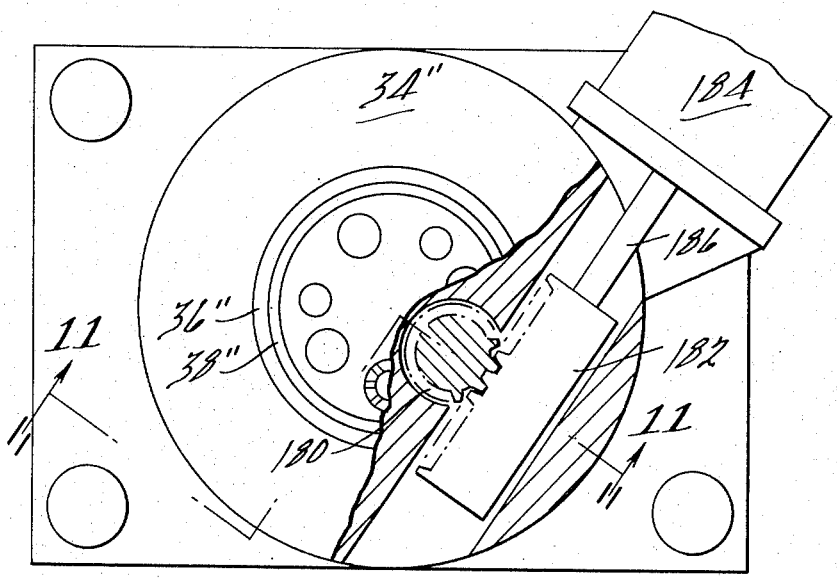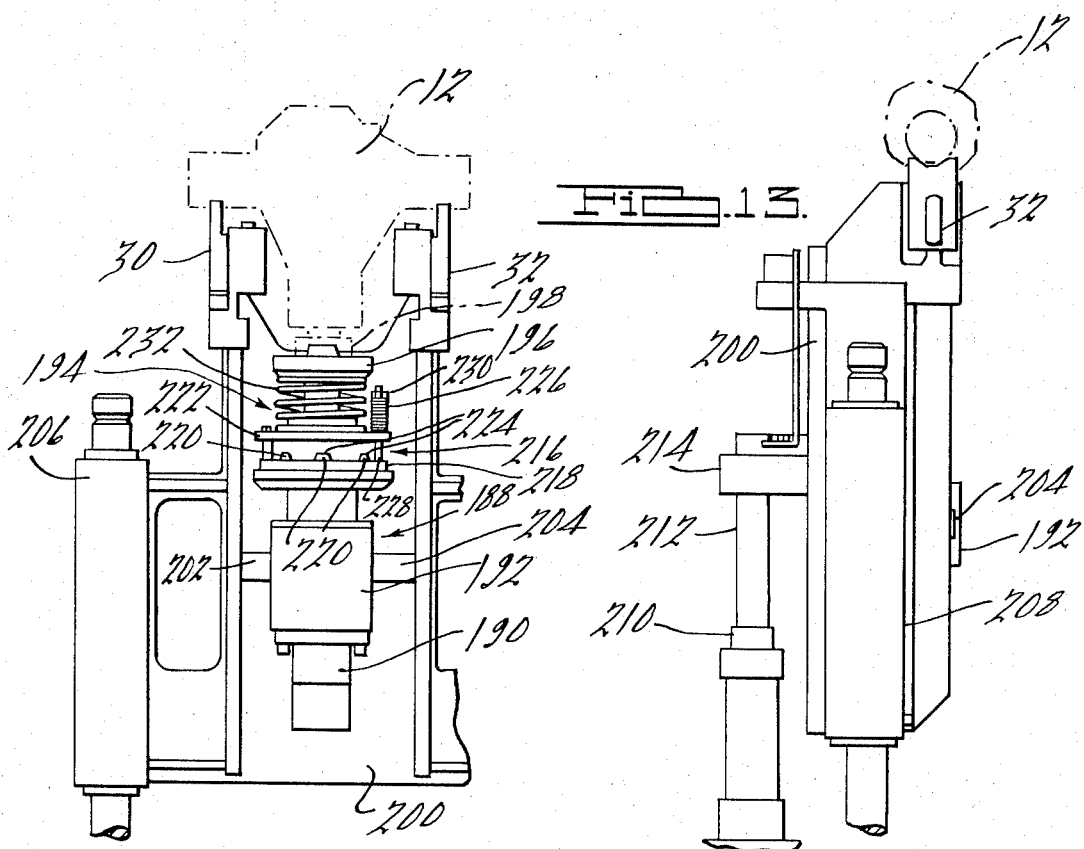

GAGE HEAD

CROSS REFERENCE TO PRIOR APPLICATION

This application is a continuation-in-part of United States application, Ser. No. 669,103, filed Sept. 20, 1967, now abandoned, and streamline continuation thereof, Ser. No. 19,551, filed Mar. 19, 1970, for Gage Head and also now abandoned. Both of the above applications are assigned to the assignee of this application.

SUMMARY AND BACKGROUND OF THE INVENTION

The invention relates generally to a mechanism for sensing the deviation of a moving member from a fixed point and more particularly relates to a mechanism for selecting bearing shims of a size to provide a predetermined amount of backlash between a drive pinion gear and ring gear of a differential drive assembly, and proper preload of the differential case bearings during assembly of the drive under conditions in which the differential case bearings are preloaded with a predetermined force, the shim being selected in accordance with the mean runout of the ring gear relative to a fixed point.

The system of the present invention is particularly adapted to be utilized with an automatic mechanism for selecting and positioning shims adjacent the bearings, and outboard thereof, in a differential drive assembly during the automatic assembly of the differential drive. In the assembly of the differential drive, it is necessary to preselect the amount of backlash which exists between the drive pinion and the ring gear during the assembly of the drive. In prior systems, it has been the practice to rotate the bearings for insuring seating of the bearings and subsequently to measure and select a shim while the assembly is in a random position of runout. Certain problems have existed with this system in that, if the shim is selected for the maximum runout, the gears have a tendency to bind when the minimum point is reached. Conversely, if the minimum runout is selected for the shim, the gears have a tendency to become loose when the maximum point is reached.

With the system of the present invention, the differential carrier of the drive is supported relative to a pair of gage heads such that the gage heads are mounted in opposition and insertable into engagement with the differential case bearings and a preselected loading of the bearings, rotatably supporting the ring gear case, is provided by the gage heads. Upon rotation of the differential case, the runout of the ring gear is sensed and fed through a transducer to a system for sensing the maximum and minimum deviation of the ring gear from a fixed point, and to derive a mean runout signal for the particular ring gear and drive pinion being measured. Thus, an accurate measure of the space between the bearings and the respective seats is provided for the selection of shims, and the shim is selected in accordance with the mean amplitude of runout, thereby substantially alleviating the problems described above.

The gage head of the present invention includes features, as for example the placing of the transducer sensor closely adjacent the work to be sensed to avoid the necessity of compensating for temperature variations by varying the dimensions of the parts in the transducer. Also, by placing the transducer finger closely adjacent the workpiece, the cumulative affect of variations and part dimensions is substantially alleviated and it is not necessary to provide elements for the transducer head or its connecting links having stringent tolerance requirements.

Further, the gage head of the present invention has been devised such that the gage head is substantially stationary in the rotary direction during the portion of the cycle that the locking finger is engaging the casing to lock the gage head to the differential carrier. In certain prior art gage heads, the gage finger is in the rotating mode during the period when the gage head is being attached to the differential carrier. With this latter system, the breakage and wear of parts is increased. Also the necessity for more stringent tolerances arises.

With one embodiment of the gage head of the present invention, all of the necessary movements of the gage head including the rotation of the locking finger and the axial engagement of the finger with the carrier is accomplished by a mechanical system of cams and springs. Thus, auxiliary cylinders, controls, and the like are eliminated and the cycle time for operating the gage head on a particular part is greatly reduced.

A second embodiment of the present invention provides a slightly modified form of the first embodiment wherein the cam system is modified to cooperate with a power cylinder disposed rearwardly of the unit. In a third embodiment the complete mechanical system of cams is replaced by a rack and pinion type gear system utilizing various limit switches.

Further variations include a pair of rotary drives, either of which may be utilized with any of the three above described embodiments. The first rotary drive system employs a collet type of coupling which is disposed centrally therewithin the gage head and is adapted to expand into engagement with an interior peripheral surface of the differential case for rotation thereof. The second rotary drive system is adapted to rotate the differential case by engagement therewith the drive pinion which drives the differential case by its engagement with the ring gear.

Accordingly, it is one object of the present invention to provide an improved gage head.

It is another object of the present invention to provide a gage head having improved operating characteristics.

It is still another object of the present invention to provide an improved gage head which substantially eliminates the necessity for a high degree of temperature compensation and parts tolerances.

It is still a further object of the present invention to provide an improved gage head which is capable of being operated so that the gage head is in the nonrotating mode during the period when the locking finger is being engaged with the part.

It is yet a further object of the present invention to provide an improved mechanism for effecting rotation of the locking finger.

It is still a further object of the present invention to provided an improved mechanism for producing actual engagement between the locking finger and the part after rotation.

It is yet another object of the present invention to provide an improved drive for rotating the ring gear.

It is still another object of the present invention to provide an improved gage head having a substantially simplified operating mechanism, and a minimum of controls and operating cylinders.

It is still a further object of the present invention to provide a gage head having a reduced cycle time over heretofore known gage heads.

It is another object of the present invention to provide an improved gage head which is reliable and accurate in operation, and is inexpensive to manufacture.

Further objects, features and advantages of this invention will become apparent from a consideration of the following description, the appended claims, and the accompanying drawings.

BRIEF DESCRIPTION OF THE DRAWINGS

FIG. 1A is an elevational view of a gage head assembly with a differential drive illustrated in cross section, in accordance with the principles of the present invention, the gage heads thereof being in position for measuring the runout of a ring gear relative to a pinion gear of the differential drive under a preselected bearing preload;

FIG. 1B is a perspective view of the gage head assembly and differential drive illustrated in FIG. 1A;

FIG. 1C is a fragmentary cross-sectional view of the bearing assembly on the left side of the differential drive as viewed in FIG. 1A, illustrating the inserted location of a properly selected bearing shim in accordance with the present invention;

FIG. 2 is an end view of a first or second preferred embodiment of the gage head assembly positioned on the left side of the differential drive of FIG. 1;

FIG. 3 is a cross-sectional view of the first preferred embodiment of FIG. 2 taken along line 3—3 thereof;

FIG. 4 is a cross-sectional view of the first preferred embodiment of FIG. 3 taken along line 4—4 thereof;

FIG. 5 is another cross-sectional view of the first preferred embodiment, similar to that illustrated in FIG. 3, with certain parts shown in phantom and illustrating the relative position of the canning mechanism and the locking finger during a portion of the cycle;

FIG. 7 is a plan view of the cam mechanism of the first or second preferred embodiment, for rotating the locking finger of the gage head;

FIG. 8 is a plan view of the cam mechanism of FIG. 7 illustrating three positions of the cam pin during the cyclical operation of the gage head;

FIG. 9 is a partial cross-sectional view of a second preferred embodiment of FIG. 2 taken along the line 9—9 thereof;

FIG. 10 is an end view of a third preferred embodiment of the gage head assembly positioned on the left side of the differential drive of FIG. 1;

FIG. 11 is a partial cross-sectional view of the third preferred embodiment of FIG. 10 taken along the line 11—11 thereof;

FIG. 12 is a side elevational view of the support structure of FIG. 1 further including an alternate drive for rotating the drive pinion; and FIG. 13 is a side view of the structure illustrated in FIG. 12.

DETAILED DESCRIPTION OF THE PREFERRED EMBODIMENTS

Figure 6:
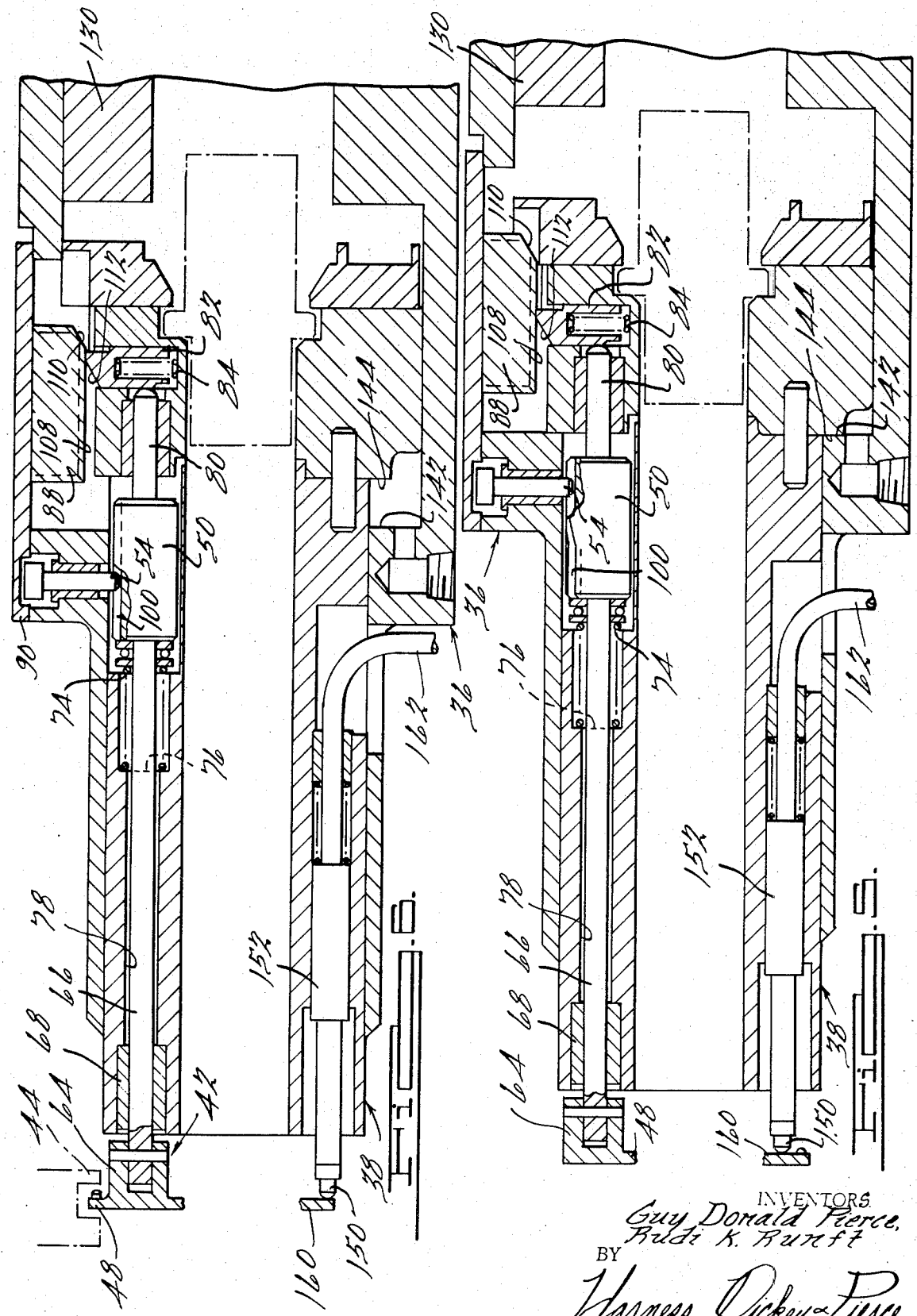
FIG. 6 is another sectional view of the first preferred embodiment, similar to FIG. 5, and illustrating still another position of the camming mechanism and locking finger during a further portion of the cycle.

Referring now to FIG. 1A, 1B, and 1C of the drawings, a measuring assembly is indicated generally at 10 for measuring the spacing between a bearing and its seat in a differential drive 12, the drive to be explained being merely representative. The differential drive 12 includes a differential case 14, typically having four relatively small gears 2, 2a, 2', 2a' housed within the case 14 and further includes a ring gear 16 suitably affixed to as by means of screws, bolts, or the like 3 to the differential case 14, and a drive pinion gear 4 which includes an integral drive shaft portion 4a having a splined section 4b at one end thereof, positioned in driving engagement with the ring gear 16. The drive pinion shaft portion 4a is rotatably supported in the differential case 14 by means of a pair of anti-friction bearing assemblies 5a and 5b, and a pinion oil seal 4c is interposed between an inner annular wall of a differential carrier 15 and a companion flange 198, the companion flange 198 having a splined bore 198a for receiving the splined portion 4b of the pinion drive shaft and retained thereto by means of a suitable nut 3a.

The four small gears 2, 2a, 2', 2a' disposed in the differential case 14 are comprised of two differential pinion gears 2a and 2a' having smooth bores and held in position by a solid pinion cross shaft 6 which is mounted and locked in the differential case 14 by means of suitable lock bolts 3b. The two side gears 2 and 2' have splined bores for indexing with each of the axle shafts (not installed at this stage of assembly) and are positioned to turn in counterbored cavities 7, 7' in the differential case 14. All four gears 2, 2a, 2', 2a' are in mesh with each other, and because the differential pinion gears 2a, 2a' turn freely on their shaft 6, they act as idler gears to permit each of the rear axle units to turn at different rotational speeds as is well known in the art.

The differential case 14, itself, is rotatably mounted in the yoke portions 18 and 20 of a differential carrier or housing 15 having a removable cover 15a by means of a pair of tapered roller bearings 26, 26' disposed in each of the yoke portions 18 and 20, respectively, each of the tapered roller bearings 26, 26' having an inner race 22, 22' supported in a seat defined at opposite axial ends of the differential case 14, and an outer race 24, 24' supported in a bearing seat in the yoke portion of the differential carrier 15 and retained therein by a bearing cap 18a, 20a.

In assembling the differential drive 12 described above, it has been found that a variation, also described above, occurs in spacing between the bearing race 24 and the corresponding bearing race 24' on the opposite side thereby requiring shims 8 (see FIG. 1C) to be inserted adjacent the outer edge of the outer race 24, 24'. However, due to variations in tolerances, these shims vary from assembly to assembly, thereby necessitating the automatic measurement of the shim required during the assembly process. In the particular system being utilized, it is found that the bearing shims vary from 0.222 inch to 0.258 inch thus establishing a range of shims which may be selected for use in the differential drive 12.

In measuring the runout of the ring gear 16, the differential carrier 15 is positioned on a pair of support members 30, 32 and a pair of gage heads 34, 35 fixedly connected at one end to a slidable support structure 9, 9' relative to a fixed base 11, 11', are inserted into opposite ends of the differential carrier 15 and engage the bearings 26 and 26'; the gage heads 34, 35 being adapted to sense the runout of the ring gear 16 upon a predetermined loading of the bearings 26 and the corresponding opposite bearing.

As will be seen from a further explanation, the gage head 34 is provided with a means for fixing a portion of the gage head 34 to the bearing race 24 such that a transducer assembly positioned within the gage head 34 is fixed relative to the ring gear 16. The gage head 34 further includes a means for rotating the differential case 14 and the ring gear 16 wherein the maximum and minimum deflection or the runout of the ring gear 16 is measured for determining the proper shim 8 to be utilized. The transducer may be connected to an electrical sensing system such as that described in U.S. Pat. No. 3,609,664 Sept. 28, 1971) to Paul E. Bosen, entitled "Automatic Control for Measuring Clearances", and assigned to the same assignee as the subject invention. With the electrical system of the indicated patent connected to the gage heads 34, 35, the maximum and minimum deviation is sensed, detected and stored, and a mean signal for the runout is derived. The assembly is again rotated and upon the approach of the ring gear to the mean position, the rotary assembly of the gage head 34 will be stopped to permit insertion of the selected shim at the mean runout position.

Referring now to FIGS. 2 and 3, there is illustrated the rotary drive gage head 34 described in conjunction with FIG. 1A, 1B, and 1C. Generally, the gage head 34 includes a slide assembly 36 which is slidably mounted on the exterior of a plunger assembly 38, both of which are axially inserted into one of the flange yokes, in this case yoke 20.

The plunger assembly 38 forms a part of a reciprocable clamp means, which further includes a finger lock assembly 42. The pair of assemblies, which comprise the clamp means, are utilized to preload the bearings and clamp the entire gage head 34 in a position subsequent to sensing runout by rotation of the ring gear 16. As best observed in FIG. 3, the plunger assembly includes an annular sleeve 39 which projects outwardly from the inward end of the gage head 34 and engages the outer race 24 of the tapered roller bearing 26 for purposes of establishing selective preloading. With reference to FIG. 2, it will be noted that the engaging end of the sleeve 39 is adapted to contact the roller bearing annularly for approximately 270° due to the absence therein of approximately one quadrant, which defines an arc-shaped void wherein the finger lock assembly 42 is disposed. The finger lock assembly 42 is adapted to engage an inward shoulder of an inward radially extending lip 44 formed in the interior of the yoke 20. With the finger lock assembly suitably positioned there behind the shoulder, a transducer assembly 47 which cooperates with the finger lock assembly 42 is positioned adjacent the preloaded bearings 22, 24 to sense the runout of the ring gear 16 as shall hereinafter become apparent.

The gage head 35, disposed in the differential carrier yoke 18 on the opposite end of the differential drive 12, is identical to the gage head 34 except comparable elements corresponding to the rotary drive means are not included, as only one rotary drive is required in one of the two reciprocating gage head assemblies. The description and operation of the gage head assembly will hereafter be described in conjunction with the gage head 34, and except for the variances noted above, it will be appreciated that the description and operation of the gage head 35 is generally identical and simultaneous.

With reference then to gage head 34, the gage head is inserted into the yoke 20, and a finger 48 of the finger lock assembly 42 is rotated by means of a cam member 50 such that the finger 48 is out of alignment with the lip 44. Upon insertion of the gage head into the yoke 20, the slide assembly 36 is hydraulically pushed to the left such that a pin member 54 cams the finger lock 48 into position through the cam member 50. After the gage head assembly is locked into position, a rotary drive assembly 58 is driven through a shaft 60 to transmit a rotary motion to the ring gear and pinion assembly within the differential drive. With the ring gear and pinion assembly in a rotary motion, the transducer assembly 47 senses the runout of the ring gear by sensing the movement of the bearing race 24, through plunger assembly 38, relative to a fixed position as defined by finger 48, and particularly portion 160 thereof. Also, the positioning of the gage head within the differential drive assembly is accomplished with a selected pressure to preload the bearing assemblies 22, 24, 26 by a predetermined amount.

The finger lock assembly 42 includes a head member 64 which is attached to a rod 66, the rod 66 being slidably contained within the plunger assembly 38. A bearing member 68 closely engages the rod 66 to provide a bearing support therefor. The opposite end of the rod member 66 supports the cam member 50, the cam member 50 being fixed thereto by means of a pin 70. The rod member 66 is resiliently biased to the right by means of a spring 74 having one end engaging a countersunk shoulder 76 within a bore 78 formed in the plunger assembly 38.

The rod member 66 passes through the cam member 50 and includes an extension 80, the end of which is adapted to engage a second cam member 82, when the second cam member 82 is pushed radially inwardly in its lowermost position against the action of a biasing spring 84. The second cam member 82 is cammed downwardly by means of a third cam member 88 fixedly attached to a plate 90 adapted to move with the slide assembly 36. The plate 90 is fixed to the slide assembly by means of a pair of screws 94, 96.

Upon the initial insertion of the gage head into the yoke 20, the parts are in their relative position shown in FIG. 5. In FIG. 5, the second cam member or cam plunger 82 is cammed into its lowermost position by means of the third cam member 88. Thus the extension 80 is moved to the left and held in this position by means of the plunger cam 82. Also, the cam member 50 is in the position shown with the pin 54 in a position to the right of cam member and engaging a camming surface 100. The camming surface 100 is illustrated in more detail in FIGS. 7 and 8, FIG. 7 illustrating the pin 54 in the extreme left or final position to seat the finger 48 behind the lip 44. It will be noted that the pin 54 rides in the cam groove 100 formed by walls 102 and 104.

FIG. 8 illustrates the three positions of the pin 54 in the groove 100 corresponding to FIGS. 3, 5 and 6. With the movement of the pin 54 in the groove 100, the cam member 50 is rotated in a counterclockwise direction as viewed from the left end of the gage head of FIG. 3.

After insertion of the gage head into the yoke 20, the slide assembly 36 is moved to the left thus moving the pin 54 in the position shown in FIG. 6 within the groove 100 of the cam member 50. With the cam member 50 in the position shown in FIG. 6, the finger 48 is positioned behind the lip 44 to apply a force to the lip to fixedly position the gage head within the yoke 20. It will be noted that the second cam member 82 remains in the lower position due to the engagement of a surface 108 of the third cam member 88 with the upper surface of the plunger 82. The spring member 74 is slightly compressed and provides a resilient bias force for the extension 80 against the plunger 82. The plunger 82 is biased upwardly by means of the spring member 84 against the surface 108. At the position shown in FIG. 6, the rotation of the locking finger 48 has been completed, as is readily determined from FIG. 8. In FIG. 8, the pin 54 is at the intermediate position and has passed the bounds of the camming surfaces 102, 104.

FIG. 3 illustrates the finger lock assembly in the final locking position wherein the pin 54 is in the extreme left position relative to the camming member 50 (see FIG. 8), and the finger 48 is in locking engagement with the lip 44. In this position, the extension 80 is permitted to move to the right due to the biasing force of the spring 74 because the third camming member 88 has been moved sufficiently to the left to permit the plunger cam 82 to move upwardly. In this upward position, the recessed portion of the lower end of plunger 82 is presented to the rear face of member 80 to permit member 80 to move rearwardly and allow finger 48 to engage shoulder 44. The cam member 82 moves to the upward position due to the spring bias force provided by spring member 84, thus moving the cam member out of abutting engagement with the extension 80. The third cam member 88 has been provided with a camming surface 110 which is adapted to engage a mating cam surface 112 on plunger member 82. It is these two camming surfaces 110, 112 which cause the plunger 82 to move downwardly at such time as the slide assembly 36 is retracted to disengage the finger 48 from the shoulder 44.

During the retracting movement, the camming members 50 and 82 move in exact opposite to the sequence described in conjunction with the locking of the gage head in position. Referring to FIG. 8, the pin 54 moves from a position illustrated in FIG. 3 to a position illustrated in FIG. 6 and finally to a position illustrated in FIG. 5 thus rotating the locking finger head 64 in a clockwise movement as viewed from the end of the gage head.

From the foregoing, it is seen that the movement of the locking finger inwardly behind the plane formed by the lip 44 and into locking engagement with the lip 44 is formed purely by a mechanical movement of the various elements as caused by the sliding motion of the slide assembly 36. Thus, the need for additional controls and plungers is alleviated. Further, it is to be noted that the gage head and ring gear elements are in a rest position during the period when the finger 48 is being placed into engagement with the lip 44. In this way, the wearing of parts and breakage is substantially eliminated.

The rotating drive assembly 58 includes a friction member or collet 120 which is adapted to frictionally engage the interior surface of the differential case 14. The friction member or collet 120 is provided with a series of slots 122 formed therein, the slots permitting the left portion of the friction member to be expanded by means of a cam head 126. The cam head is connected to a tube 128, the tube 128 being utilized to cause the head 126 to move in an axial direction and expand the friction member 120.

With the friction member 120 in frictional engagement with the member of the differential drive to be rotated, the complete assembly 58 is rotated within a portion 130 of the slide assembly 36 by means of a tube 132. The tube 132 is connected to an exterior housing tube 134 by means of a threaded portion 136, wherein the tube 132 is rotatably received within the portion 130 by means of a bearing member 138.

Upon initial insertion of the assembly 58 into the differential drive assembly, the head 126 is to its extreme left position thus permitting the friction member or collet 120 to contract. After positioning of the rotary drive assembly 58, the head 126 is retracted to the right to cause the left portion of the friction member or collet 120 to expand and frictionally grip the differential case 14 which is to be rotated within the differential carrier 15. Subsequently, the tube 132 is rotated to cause rotation of the friction member 130 and consequently the differential case 14 by virtue of the frictional engagement therewith.

A plurality of spring members 140 is provided to resiliently bias the plunger assembly 38 in a direction away from or out of the slide assembly 36. This outward motion of the plunger assembly 38 relative to the slide assembly 36 is limited by means of a pair of engaging shoulders 142, 144, which are illustrated as being in engagement in FIG. 5. As will be noted, FIG. 5 illustrates the gage head assembly in the retracted position and FIG. 3 illustrates the gage head assembly in the fully extended position with the surfaces 142, 144 at their greatest separation. Upon retraction of the gage head assembly from the differential drive, the shoulders 142, 144 coact to retrieve the plunger assembly 38 from the differential drive.

As stated above, the runout or undulations of the ring gear as transmitted through the bearings 22, 24, 26, are sensed by means of a transducer assembly 47. The transducer assembly includes a finger element 150 which is connected to the main transducer senser element 152 by means of a plunger member 154. The transducer element 152 may be of the type described in the copending application previously referenced, that is, of the low voltage differential transformer type wherein the finger 150 either forms a part of the armature of the differential transformer or is utilized to actuate the differential transformer armature. The finger 150 is adapted to engage an element 160 of the finger lock assembly 42, the actual movement of the element being correlated with the undulating movements of the bearings 22, 24, 26. The output of the transducer element 152 is derived by means of a cable 162, the end of which may be connected to the electrical system described in conjunction with the aforementioned copending application.

Turning now to a second embodiment of the gage head assembly, and with reference to FIG. 9, a gage head is illustrated at 34', varying essentially from the first embodiment in the means employed for effecting selective movement of the finger lock assembly 42 and the rotary drive is not shown. It is to be understood that either of the rotary drives illustrated in FIG. 3 or FIGS. 12 and 13 may be used in association with the embodiment. For purposes of clarity, all component parts of the gage head of the second embodiment which are common to the first embodiment are designated by like numerals having a prime (') suffix.

The hub end of a differential carrier is indicated in phantom at 15 and includes a differential case 14 connected to a ring gear (not shown). The differential case 14 is rotatably supported within the differential carrier 15 by means of a tapered roller bearing 26, which includes an inner race 22 and an outer race 24. An inward projecting annular lip 44 is disposed within the bore of the differential carrier 15 and defines a shoulder 45. The axial space between the shoulder 45 and the outward face of the outer race 24 is adapted to receive a properly sized shim as determined by the gage head means previously described.

The gage head 34' includes a plunger assembly 38', which is adapted to selectively preload the bearings 26 in the same manner as described for the first embodiment, and a finger lock assembly 42' of generally modified construction as shall now be described. The finger lock assembly 42' is comprised of a head member 64' which is attached to one end of a rod 66', the rod 66' being slidably contained within the plunger assembly 38'. A bearing member 68' closely engages the rod 66' to provide a bearing support for one end therefor. An intermediary axial portion of the rod member 66' supports a cam member 50', the cam member being fixed thereto by means of a pin 70'. The rod member 66' is resiliently biased to the right by means of a spring 74' having one end engaging a countersunk shoulder 76', within a bore 78' formed in the plunger assembly 38'.

The rod member 66' passes through the cam member 50' and includes an extension 80', the end of which extends outwardly from a transverse outer face 130' located at the right end of the gage head 34'. The cam member 50' includes a groove 100 wherein is located the guiding end of a pin member 54'. The interaction of the pin member 54' and the cam member 50' is best illustrated in FIGS. 7 and 8 and the function of the relative positions thereof were previously described in conjunction with the first embodiment.

On the right end of the gage head 34', a power cylinder 170 is mounted on a first fixed support 172 and a second support, the second support not being illustrated but disposed to the right of support 172. Both the first support member 172 and the second support member are carried by a base plate 176 which extends to the left and supports the right end of the gage head 34'. A power cylinder 170, which includes a piston rod 178, is suitably located to axially align with the projecting end of the rod member 66' for purposes that shall become apparent as the operation of the second embodiment is hereinafter described. Initially, it is sufficient to say that the cylinder 170 and rod 178 are provided to hold finger 48' clear of shoulder 44' during rotation of finger 48' and to control engagement of these two elements in the final stage.

Initially, the piston rod 178 is advanced to the left to engage the rod member 66', against the bias of the spring 74', so that the pin member 54' is disposed at the rearward of left end of the cam slot 100'. In this position, it will be appreciated that the finger 48' of the finger lock assembly 42' is disposed in such a manner as to radially clear the projecting lip 44 of the differential carrier 15.

With the finger lock assembly 42' in this position, the gage head 34' is inserted into the bore of the differential carrier 15 and advanced therein to locate the finger 48' behind a shoulder 45, defined inwardly by the lip 44, and to engage the forward face of the plunger assembly 38' against the outer race 24 of the bearing 26. Upon contact with the bearing 26, continued advancement of the plunger assembly 38' is adapted to urge the bearing 26 in a tightly seated position against a shoulder 13 defined therein a hub of the differential case 14. Once the bearing 26 is tightly seated, the outer sleeve 37' of the slide assembly 36' is actuated to slide forwardly on the plunger assembly 38' wherein the pin 54' is advanced in the cam slot 100' so as to rotate the finger 48' to a radial position behind the shoulder 45, but inwardly axially spaced therefrom. As the slide assembly 36' approaches the end of its forwardly engaging movement, a limit switch (not shown) is contacted to energize a valve (not shown) for retracting the power cylinder 170, and consequently, the piston rod 178. The release of the piston rod 178 allows the finger 48' to axially engage the shoulder 45 due to the bias of the spring 74' acting on the face of the cam member 50'. The gage head 34' is now suitably engaged and clamped so that the ring gear runout may be determined by methods previously described for the first embodiment.

After the properly sized shim has been determined by the transducer assembly, the gage head is retracted by reversing the above sequence of events. The limit switch described above, or a second limit switch, interlocked in the machine cycle, is tripped to energize the valve operating the power cylinder 170, which is adapted to advance the piston rod 178 again into contact with the rod member 66', and to axially disengage the finger 48' from the shoulder 45. After disengagement, the indicated limit switch is tripped to retract the slide on which the gage head 34' is mounted. During the initial portion of the retractive cycle, it will be noted that the plunger assembly 38' is held solidly against the outer race 24 of the bearing 26 by a plurality of heavy springs 140' disposed at the rear of the gage head 34'. As the slide assembly 36' moves rearwardly relative to the plunger assembly 38', the pin member 54' traverses the cam slot 100 so as to rotate the finger 48' to a radial position to clear of the lip 44. As in the first embodiment, however, when shoulder 142' engages shoulder 144', all components of the gage head 34' retract as a unit so that the gage head 34 may be completely withdrawn from the differential carrier 15.

Turning now to a third embodiment of the gage head assembly and with reference to FIGS. 10 and 11, a gage head is illustrated at 34" varying essentially from the second embodiment in that the cam member 50' and pin member 54' are replaced by a rack and pinion gear arrangement. For purposes of clarity, all component parts of the third embodiment which are common to the first and second embodiments are designated by like numerals having a double prime ('') suffix.

In FIG. 11, the differential drive again includes a differential carrier 15 having a lip 44 defines shoulder 45, a differential case 14 having shoulder 13, and tapered roller bearings 26 having inner race 22 and outer race 24. The gage head 34'' includes a plunger assembly 38'', which is adapted to selectively preload the bearings 26 in the same manner as was described for the first and second embodiments, and a finger lock assembly 42'' of generally modified construction as shall now be described.

The finger lock assembly 42'' is comprised of a head member 64'' which is attached to one end of a finger rod 66'', the finger rod 66'' being slidably contained within the plunger assembly 38''. As before, a bearing member 68'' closely engages the rod 66'' to provide a bearing support for one end thereof. A pinion gear 180 is suitably connected to an axial intermediary portion of the rod 66'', and is adapted to rotate the rod 66'' as shall subsequently become apparent. As in the other embodiments, the rod member 66'' is resiliently biased to the right by means of a spring 74'', the spring 74'' having one end which engages a countersunk shoulder 76'' within a bore 78'' formed in the plunger assembly 38''.

The finger rod member 66'' further includes an extension 80'' which projects outwardly therefrom the right end of the gage head 34'' and is adapted to be axially motivated by a power cylinder unit disposed rearwardly of the gage head 34'', and identical to the power cylinder apparatus described for the second embodiment. As best observed in FIG. 10, radial movement of the finger head assembly 42'' is accomplished by a rack member 182 in driving cooperation with the pinion gear 180, and actuated by a hydraulic cylinder 184 having a piston rod 186 connected therewith the rack 182. Preferably, the hydraulic cylinder is mounted to the outer casing of the slide assembly 34'' with the rack 182 and pinion gear 180 being located substantially in the same space occupied by the cam member 50 and pin 54' of the second embodiment.

The third embodiment of the gage head 34'' is adapted to operate in the same manner as described for the second embodiment except the finger 48'' will not be rotated automatically by the relative sliding movement of the plunger assembly 38'' and the slide assembly 36''. In this instance, the rotation of the finger 48'' will be accomplished positively by the hydraulic cylinder 184 which is controlled by various limit switches, suitably interlocked with the machine cycle in accordance with conventional practice. It will be appreciated, however, that the engaging shoulders 140'' and 142'' of the slide and plunger assemblies 36 and 38, respectively, are retained in the third embodiment, as well as the plurality of heavy springs 140'', to preload the bearings uniformly and accurately notwithstanding the act that these shoulder members no longer contribute to the selected radial movement of the finger lock assembly 42''. Also it will be further appreciated that the engaging shoulder 144'' is suitably modified so as not to interfere with the cooperating rack 182 and pinion gear 18 combination.

With respect to any of the three embodiments herein described, the mean runout of the ring gear 16 is preferably determined when the backlash between the ring gear 16 and the drive pinion is zero. As will be recalled, initially the differential case 14 is supported in the differential carrier 15 with the side bearings 26 loosely resting on and shiftable relative to the side bearing seats. By preferentially increasing the preload on the bearing disposed on the side of the differential carrier tending to urge the engagement therebetween the ring gear 16 and driving pinion gear, a zero backlash therebetween the gear members is provided. For a conventional differential drive, a difference of preload of approximately 200 pounds has been found adequate to suitably achieve sufficient contact between the ring gear and the driving pinion gear. As illustrated in FIG. 1 of the drawings then, the plunger assembly 38 of gage head 34 is adapted to inwardly engage and preload the bearings 26 disposed on the left side of the carrier 15 with a greater inward force and preload, than the corresponding plunger assembly of the gage head 35 with respect to the bearings disposed on the right side.

With reference now to FIGS. 12 and 13, a preferred rotary drive mechanism is indicated generally at 188 in relationship with the differential drive 12 and the support structure 30 and 32 therefor. The rotary drive mechanism 188 is comprised of a rotary motor 190 drivingly engaged through a bearing assembly 192 to a drive coupling assembly 194, which includes a drive coupling 196 adapted to engage the companion coupling 198 connected to the drive pinion 4 of the differential drive 12.

The rotary drive mechanism 188 is connected to a vertically sliding plate 200 by means of a pair of retention plates 202 and 204 which support an outer casing of the bearing assembly 192 and suitably align the mechanism 188 with the vertical centerline of the drive pinion 4 of the differential drive 12. The plate 200 is slidably guided by a pair of hydraulic cylinders 206 and 208 disposed on opposite sides of support structure 30 and 32 respectively and selectively slidable by means of a hydraulic cylinder 210 located on the left side of the plate 200 as illustrated in FIG. 13. A shaft portion 212 of the cylinder 210 is secured to an outwardly extending plate member 214 suitably connected to the outer face of the plate 200, and vertically movable by means of suitable hydraulic valves as is conventional in the art.

The drive coupling assembly 194, in addition to the drive coupling 196, includes a slip or overload member 216 which is adapted to disengage upon the occurrence of a preselected torque level. The overload member 216 is comprised of a lower driving ring 218 which includes a plurality of teeth 220 having inclined sidewalls, and an upper driving ring 222 having suitably shaped grooves 224 adapted to receive the teeth 220. The upper ring is biasly urged against the lower ring by a plurality of spring members 226 disposed on guide pins 228 threadedly engaged to the lower ring 218 and extending through suitably spaced openings extending axially through the upper ring 222. The spring 226 are retained and selectively preloaded against the upper ring by means of suitable connectors such as a washer and nut 230. As is now apparent in the event of an overload, the upper ring will be displaced upwardly against the bias of the springs and the teeth 220 will become disengaged from their respective grooves 224 terminating any subsequent rotation of the drive coupling 196.

The drive coupling 196 is vertically resiliently supported by means of a coil spring 232 which allows the drive coupling 196 to engage the companion flange at any random rotational position and be properly engaged therewith upon initiation of rotational movement, the friction force provided by the spring 232 being insufficient to rotate the companion flange 196 until the corresponding members are fully seated.

For controlling the cycle of the rotary drive mechanism 188, both the fluid motor 190 and hydraulic cylinder 196 are controlled by limit switches through hydraulic valves in the conventional manner, and preferably, the limit switches are suitably interlocked in the operating cycle of the machine for regulation thereof. For clarity, the operation of the rotary drive mechanism 188 will now be described.

In operation, the hydraulic cylinder 196 is actuated to raise the rotary drive mechanism 188 so as to position the coupling member 194 in relative engagement with the companion flange 196. The coupling member 194 is adapted to engage the companion flange 198, and as it is concurrently rotated it engages and seats with the companion flange 196 providing interconnection therebetween. After the rotary drive mechanism 188 is raised and coupled in cooperative engagement with the driving pinion gear 4, and the side bearings 26, 26' are selectively preloaded by the gage heads 34 and 35, the fluid motor 190 is operated to rotate the pinion gear 4 and thus the ring gear 16 to determine the runout thereof.

Generally speaking, the rotary drive mechanism 188 is preferred over the rotary drive assembly 58, described in conjunction with the first embodiment of the gage head assembly, as it is substantially stronger than the collet type of drive arrangement and is adaptable to function with any size differential drive including the considerably smaller differential drive embodied in to so-called compact vehicle case. It will be appreciated, however, that either of the rotary drives, however, are adapted for use with any of the three embodiments herein described.

Preferably, both of the rotary drives also include a brake mechanism for stopping the rotation of the ring gear automatically in the mean runout position. As indicated previously, the transducer assembly 47 in the gage head 34 is adapted to sense the undulating movement of peaks and valleys with respect to the ring gear, and to determine the mean runout thereof, for proper selection of a bearing shim. With respect to the bearing shim supporting the differential case 14 disposed at the opposite end of the differential carrier 15, and the gage head 35 inserted therein, it will be appreciated that there is no need to duplicate the undulating sensing of the ring gear as this data is readily provided by the transducer assembly 47 of the gage head 34. It is required, however, to select a bearing shim for the opposite bearing which will correspond to the mean runout position of the ring gear. Thus by means of the braking mechanism stopping the rotation of the differential case 14 at the mean runout position of the ring gear, the transducer assembly disposed in the gage head 35 is merely required to determine the axial distance between the inward shoulder as defined by the lip 44 and the corresponding outer race of the bearing member. It will be noted then that the measuring system for the gage head 35 may be greatly simplified over the maximum-minimum measuring system of the gage head 34, and that a pair of properly sized bearing shims will be sized which is coordinated to the mean runout position.

While it will be apparent that the embodiments of the invention herein disclosed are well calculated to fulfill the objects of the invention, it will be appreciated that the invention is susceptible to modifications, variation and change without departing from the proper scope or fair meaning of the subjoined claims.

What is claimed is:

1. In a machine for assembling a differential drive of the type provided with a differential case fixedly supporting a ring gear and having aligned hub portions disposed in bearings mounted on seats provided in an outer differential carrier which also supports a rotatable drive pinion in mesh with the ring gear, mechanism for preloading the bearings and providing an output signal having a characteristic which varies in accordance with the variation of the spacing between the bearings and seats under the preload conditions, assembly of the drive occurring under conditions in which the case is supported in the carrier with the bearings loosely resting on and shiftable relative to said seats, said mechanism comprising gage head means having reciprocable clamp means movable in a first direction against the bearings to shift the bearings and the differential case bodily in the carrier, and operable simultaneously to preload the bearings with predetermined force; rotary drive means operable to rotate the ring gear and said case while the bearings are preloaded by said clamp means, and means coactive with said gage head means for providing an output signal having a condition which varies as a function of the variation in spacing between the bearings and bearing seats during rotation of the ring gear by said drive means and under said preload conditions.

2. The combination as set forth in claim 1, wherein said signal condition varies as a function of the runout of the ring gear and drive pinion assembly under said bearing preload conditions, said function including the mean runout of said ring gear and pinion assembly.

3. The combination as set forth in claim 1, wherein said gage head means includes spaced gage heads having said clamp means movable in opposite directions against said bearings.

4. The combination as set forth in claim 1, wherein said coactive means includes a transducer assembly having a sensing finger, said transducer assembly being mounted closely adjacent said bearings during rotation of said case.

5. The combination as set forth in claim 1, wherein said reciprocable clamp means includes finger means rotatably and axially movable relative to said gage head means for locking said gage head means to said differential carrier.

6. The combination of claim 5, wherein said finger means engages a surface on the differential carrier, said clamping means including a cam assembly for initially positioning said finger means beyond the surface and out of alignment with the surface, and subsequently rotating said finger means into alignment with the surface and into engagement therewith.

7. The combination of claim 6, wherein said clamp means further includes a rod mounting said finger means at one end thereof and said cam assembly at the other end, and means for resiliently biasing said finger means into engagement with the surface.

8. The combination of claim 6, wherein said finger means is rotated and positioned into engagement with the surface while said rotary drive means is stationary.

9. The combination of claim 6, wherein said gage head means further includes a plunger assembly adapted to be inserted into the carrier and a slide assembly slidably mounted for axial movement relative to said plunger assembly, said cam assembly including a first movable cam member, a cooperating member fixedly supported on said slide assembly and a cam surface formed on one of said cam member and said cooperating member, the axial movement of said slide assembly causing rotation of said finger means through said cam member and said cooperating member.

10. The combination of claim 6, wherein said gage head means further includes a plunger assembly adapted to be inserted into the differential carrier and a slide assembly slidably mounted for axial movement relative to said plunger assembly, said cam assembly including a first movable cam member, a cooperating member fixedly supported on said slide assembly and a cam surface formed on at least one of said cam member and said cooperating member, the axial movement of said slide assembly causing axial movement of said finger means to reciprocate said finger means into and out of engagement with the surface through said first cam member and said cooperating member.

11. The combination of claim 10, wherein said cam assembly further includes a second movable member, a second cooperating member and a second cam surface formed on one of said second members, the axial movement of said slide assembly causing rotational movement of said finger means into alignment with the surface through said second cam member and cooperating member.

12. The combination of claim 11, wherein said axial movement first causes said rotation and subsequently causes said reciprocating movement of said finger means.

13. The combination of claim 9, wherein said cam member is formed generally as a cylinder, and said cam surface is formed circumferentially about said cylinder.

14. The combination of claim 13, wherein said cooperating member is formed as a pin engageable with said cam surface.

15. The combination of claim 10, wherein said clamp means further includes a rod mounting said finger means at one end thereof and said cam assembly at the other end, and means for resiliently biasing said finger means into engagement with the surface.

16. The combination of claim 15, wherein said cam member is formed as a plunger adapted to move into and out of engagement with an end of said rod, the engagement of said rod moving said finger means out of engagement with the surface.

17. The combination of claim 16, wherein said cam member and said cooperating member are both formed with cam surfaces, the axial movement of said slide assembly in one direction camming said plunger in a first direction transverse to the direction of movement of said rod and the axial movement of said assembly in a direction opposite to sand one direction releasing said rod.

18. The combination of claim 17 further including resilient means biasing said rod in a direction tending to engage said finger with the surface.

19. The combination as set forth in claim 5, wherein said finger means engages a surface on the differential case, said clamping means including a gear assembly for initially positioning said finger means beyond the surface and out of alignment with the surface, and subsequently rotating said finger means into alignment with the surface and into engagement therewith.

20. The combination as set forth in claim 19, wherein said clamp means further includes a rod mounting said finger means at one end thereof and said gear assembly intermediary from the other end, and means for resiliently biasing said finger means into engagement with the surface.

21. The combination as set forth in claim 19, wherein said finger means is rotated and positioned into engagement with the surface while said rotary drive means is stationary.

22. The combination as set forth in claim 19, wherein said gage head means further includes a plunger assembly adapted to be inserted into the differential carrier, and a slide assembly slidably mounted for axial movement relative to said plunger assembly; and wherein said gear assembly including a pinion gear, a cooperating gear member supported on said slide assembly, and means for driving said cooperating gear member to effect rotation of said finger means.

23. The combination as set forth in claim 22, wherein said driving means includes a power cylinder supported on said slide assembly.

24. The combination as set forth in claim 6, wherein said clamp means further comprises a rod mounting said finger means at one end and said cam assembly intermediary an opposite end, and including means for resiliently biasing said finger means into engagement with the surface.

25. The combination as set forth in claim 24 further including a power cylinder in axially driving cooperation with an opposite end of said rod for effecting relative movement of said rod and said cam assembly.

26. The combination as set forth in claim 1, wherein said rotary drive means comprises an elongate tube rotatably supported by said gage head means and having one end projecting outwardly therefrom, an expansible sleeve supported on said one end of the tube and adapted to be loosely received therein the bore of the differential case, a camming member disposed in the bore of said sleeve for expanding said sleeve into frictional engagement with the bore of the differential case, and means for rotating said tube member whereby said differential case will be correspondingly rotated.

27. The combination as set forth in claim 1, wherein said rotary drive means comprises a coupling removably connected to the rotatable drive pinion, and means for rotating said coupling to rotate the ring gear via the drive pinion.

28. In a machine for assembling a differential drive of the type provided with a differential gear case fixedly supporting a ring gear and having aligned hub portions disposed in bearings mounted on seats provided in an outer differential carrier which also supports a rotatable drive pinion in mesh with the ring gear, mechanism for preloading the bearings and providing an output signal having a characteristic which varies in accordance with the variation of a characteristic of one of the ring gear and the bearings under preload conditions, assembly of the drive occurring under conditions in which the case is supported in the carrier with the bearings loosely resting on and shiftable relative to said seats, said mechanism comprising gage head means having means operable to shift and preload the bearings with predetermined force; rotary drive means operable to rotate the ring gear while said bearings are preloaded and means coactive with said gage head means for providing an output signal having a condition which varies as a function of the variation in spacing.

* * * * *

UNITED STATES PATENT OFFICE
CERTIFICATE OF CORRECTION

Patent No. 3,698,056          Dated October 17, 1972

Inventor(s) Guy Donald Pierce and Rudi K. Runft

It is certified that error appears in the above-identified patent and that said Letters Patent are hereby corrected as shown below:

Column 3, line 42, "canning" should have been --camming--. Column 11, line 65, "act" should have been --fact--. Column 13, line 45, "to" should have been --the--. Column 16, line 6, Claim 17, after "said" insert --slide--.
            Claim 17, "sand" should have been --said--.

Signed and sealed this 10th day of April 1973.

(SEAL)
Attest:

EDWARD M. FLETCHER, JR.          ROBERT GOTTSCHALK
Attesting O;ficer                Commissioner of Patents